(12) United States Patent
Blue et al.

(10) Patent No.: US 9,336,333 B2
(45) Date of Patent: May 10, 2016

(54) SEARCHING AND REFERENCE CHECKING WITHIN SOCIAL NETWORKS

(75) Inventors: Allen Blue, Sunnyvale, CA (US); Edward Tau, San Jose, CA (US); James Duncan Work, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 11/674,027

(22) Filed: Feb. 12, 2007

(65) Prior Publication Data

US 2007/0245245 A1 Oct. 18, 2007

Related U.S. Application Data

(60) Provisional application No. 60/773,008, filed on Feb. 13, 2006.

(51) Int. Cl.
*G06F 7/00* (2006.01)
*G06F 17/30* (2006.01)
*G06Q 10/10* (2012.01)
*H04L 12/58* (2006.01)

(52) U.S. Cl.
CPC .... *G06F 17/30994* (2013.01); *G06F 17/30864* (2013.01); *G06Q 10/10* (2013.01); *H04L 12/588* (2013.01); *H04L 51/32* (2013.01); *H04L 12/5855* (2013.01)

(58) Field of Classification Search
USPC .................................................. 707/758, 770
See application file for complete search history.

(56) References Cited

U.S. PATENT DOCUMENTS

| | | | |
|---|---|---|---|
| 5,164,897 A | 11/1992 | Clark et al. |
| 5,426,700 A | 6/1995 | Berson |
| 5,475,819 A | 12/1995 | Miller et al. |
| 5,694,595 A | 12/1997 | Jacobs et al. |
| 5,729,735 A | 3/1998 | Meyering |
| 5,758,324 A | 5/1998 | Hartman et al. |
| 5,832,497 A | 11/1998 | Taylor |

(Continued)

FOREIGN PATENT DOCUMENTS

| | | |
|---|---|---|
| WO | 99/39279 A | 8/1999 |
| WO | 01/77793 | 10/2001 |
| WO | WO 2008147330 A1 * | 12/2008 |

OTHER PUBLICATIONS

NET DEVA; PCT/US01/15021 filed May 9, 2001; International Search Report; ISA/EP; Oct. 7, 2002; 5pp.

(Continued)

*Primary Examiner* — Kimberly Wilson
*Assistant Examiner* — Michael Pham
(74) *Attorney, Agent, or Firm* — Schwegman Lundberg & Woessner, P.A.

(57) ABSTRACT

A computer-implemented method for identifying a potential reference is disclosed. In one embodiment, a user interface (UI) object (e.g., a one-click reference search button) is provided, for example, on a web page displayed at a user's client device. When selected, the UI object causes a reference search query to be generated. The search query identifies the user performing the search, and a target person for whom the user would like a reference. The search query is communicated to, and processed by, a social networking system (e.g., through an API function call). In turn, the social networking system returns information about potential references to the client.

15 Claims, 5 Drawing Sheets

(56) References Cited

U.S. PATENT DOCUMENTS

| | | | |
|---|---|---|---|
| 5,884,270 A | 3/1999 | Walker et al. | |
| 5,978,768 A | 11/1999 | McGovern et al. | |
| 5,987,440 A | 11/1999 | O'Neil et al. | |
| 6,073,106 A | 6/2000 | Rozen et al. | |
| 6,078,924 A | 6/2000 | Ainsbury et al. | |
| 6,092,197 A | 7/2000 | Coueignoux | |
| 6,112,186 A | 8/2000 | Bergh et al. | |
| 6,115,709 A * | 9/2000 | Gilmour et al. | 707/9 |
| 6,175,831 B1 | 1/2001 | Weinreich et al. | |
| 6,205,472 B1 | 3/2001 | Gilmour | |
| 6,266,659 B1 | 7/2001 | Nadkami | |
| 6,269,369 B1 | 7/2001 | Robertson | |
| 6,363,394 B1 | 3/2002 | Rajarajan et al. | |
| 6,381,592 B1 | 4/2002 | Reuning | |
| 6,385,620 B1 | 5/2002 | Kurzius et al. | |
| 6,405,197 B2 | 6/2002 | Gilmour | |
| 6,567,784 B2 | 5/2003 | Bukow | |
| 6,665,389 B1 | 12/2003 | Haste, III | |
| 6,678,516 B2 | 1/2004 | Nordman et al. | |
| 6,714,916 B1 | 3/2004 | Robertson et al. | |
| 6,879,985 B2 * | 4/2005 | Deguchi et al. | 707/101 |
| 7,069,308 B2 * | 6/2006 | Abrams | 709/218 |
| 7,117,254 B2 * | 10/2006 | Lunt et al. | 709/218 |
| 7,177,880 B2 * | 2/2007 | Ruvolo et al. | 707/104.1 |
| 7,181,498 B2 | 2/2007 | Zhu et al. | |
| 7,325,012 B2 * | 1/2008 | Nagy | |
| 7,343,365 B2 * | 3/2008 | Farnham et al. | 707/1 |
| 7,472,110 B2 * | 12/2008 | Achlioptas | |
| 7,613,695 B1 * | 11/2009 | Solomon et al. | |
| 7,716,140 B1 * | 5/2010 | Nielsen et al. | 705/319 |
| 7,831,684 B1 * | 11/2010 | Lawler et al. | 709/217 |
| 8,010,460 B2 * | 8/2011 | Work et al. | 705/319 |
| 9,043,405 B2 | 5/2015 | Ly et al. | |
| 2001/0042000 A1 | 11/2001 | Defoor, Jr. | |
| 2002/0023230 A1 | 2/2002 | Bolnick et al. | |
| 2002/0046074 A1 | 4/2002 | Barton | |
| 2002/0055870 A1 | 5/2002 | Thomas | |
| 2002/0059201 A1 * | 5/2002 | Work | 707/3 |
| 2002/0091667 A1 | 7/2002 | Jaipuria et al. | |
| 2002/0145626 A1 | 10/2002 | Richards et al. | |
| 2002/0194049 A1 | 12/2002 | Boyd | |
| 2002/0194112 A1 | 12/2002 | dePinto et al. | |
| 2003/0063072 A1 | 4/2003 | Brandenberg et al. | |
| 2004/0030566 A1 | 2/2004 | Brooks Rix | |
| 2004/0044536 A1 * | 3/2004 | Fitzpatrick et al. | 705/1 |
| 2004/0122803 A1 * | 6/2004 | Dom et al. | 707/3 |
| 2004/0122855 A1 | 6/2004 | Ruvolo et al. | |
| 2004/0148275 A1 | 7/2004 | Achlioptas | |
| 2004/0167813 A1 | 8/2004 | Robertson et al. | |
| 2004/0215793 A1 * | 10/2004 | Ryan et al. | 709/229 |
| 2005/0021750 A1 * | 1/2005 | Abrams | 709/225 |
| 2005/0044423 A1 | 2/2005 | Mellmer et al. | |
| 2005/0125408 A1 | 6/2005 | Somaroo et al. | |
| 2005/0131894 A1 | 6/2005 | Vuong | |
| 2005/0144483 A1 | 6/2005 | Robertson et al. | |
| 2005/0154639 A1 | 7/2005 | Zetmeir | |
| 2005/0159970 A1 | 7/2005 | Buyukkokten et al. | |
| 2005/0159998 A1 | 7/2005 | Buyukkokten et al. | |
| 2005/0171799 A1 * | 8/2005 | Hull et al. | 705/1 |
| 2005/0171954 A1 | 8/2005 | Hull et al. | |
| 2005/0171955 A1 * | 8/2005 | Hull et al. | 707/10 |
| 2005/0177385 A1 * | 8/2005 | Hull et al. | 705/1 |
| 2005/0198171 A1 | 9/2005 | Landsman et al. | |
| 2005/0198305 A1 | 9/2005 | Pezaris et al. | |
| 2005/0216295 A1 | 9/2005 | Abrahamsohn | |
| 2005/0216300 A1 | 9/2005 | Appelman et al. | |
| 2005/0235062 A1 * | 10/2005 | Lunt et al. | 709/225 |
| 2005/0246420 A1 | 11/2005 | Little | |
| 2005/0272413 A1 * | 12/2005 | Bourne | 455/415 |
| 2005/0283497 A1 * | 12/2005 | Nurminen et al. | 707/104.1 |
| 2006/0004703 A1 | 1/2006 | Spivack et al. | |
| 2006/0004914 A1 * | 1/2006 | Kelly et al. | 709/219 |
| 2006/0041543 A1 * | 2/2006 | Achlioptas | 707/3 |
| 2006/0042483 A1 * | 3/2006 | Work et al. | 101/91 |
| 2006/0064436 A1 * | 3/2006 | Fowler et al. | 707/104.1 |
| 2006/0069732 A1 | 3/2006 | Shannon et al. | |
| 2006/0085259 A1 | 4/2006 | Nicholas et al. | |
| 2006/0100919 A1 | 5/2006 | Levine | |
| 2006/0106670 A1 | 5/2006 | Cai et al. | |
| 2006/0111975 A1 * | 5/2006 | Fowler et al. | 705/14 |
| 2006/0117378 A1 | 6/2006 | Tam et al. | |
| 2006/0123127 A1 | 6/2006 | Littlefield | |
| 2006/0155750 A1 | 7/2006 | Fowler et al. | |
| 2006/0165040 A1 | 7/2006 | Rathod et al. | |
| 2006/0173957 A1 | 8/2006 | Robinson et al. | |
| 2006/0190536 A1 * | 8/2006 | Strong et al. | 709/204 |
| 2006/0224675 A1 | 10/2006 | Fox et al. | |
| 2006/0235969 A1 | 10/2006 | Dugan | |
| 2006/0242014 A1 * | 10/2006 | Marshall et al. | 705/14 |
| 2007/0174304 A1 * | 7/2007 | Shrufi et al. | 707/100 |
| 2007/0250361 A1 | 10/2007 | Hazy | |
| 2007/0250483 A1 | 10/2007 | Blue et al. | |
| 2007/0250585 A1 | 10/2007 | Ly et al. | |
| 2008/0005072 A1 | 1/2008 | Meek et al. | |
| 2008/0021870 A1 * | 1/2008 | Birnbaum et al. | 707/3 |
| 2008/0040428 A1 * | 2/2008 | Wei et al. | 709/204 |
| 2008/0097826 A1 | 4/2008 | Leach et al. | |
| 2008/0103907 A1 * | 5/2008 | Maislos et al. | 705/14 |
| 2008/0126476 A1 | 5/2008 | Nicholas et al. | |

OTHER PUBLICATIONS

Kautz et al; Agent Amplified Communication; Proceedings of the 13th National Conference on Artificial Intelligence and the 8th Innovative Applications of Artificial Intelligence Conference; vol. 1, Aug. 4-8, 1996, pp. 3-9 XP002102512.

Foner L.N.; A Multi-Agent Referral System for Matchmaking; Proceedings of the First International Conference on the Practical Application of Intelligent Agents and Multi-Agent Technology; Apr. 22-24, 1996; pp. 245-261; XP002200834.

NET DEVA; PCT/US01/15021 filed May 9, 2001; International Preliminary Examination Report; IPEA/US; Jun. 19, 2003; 5pp.

Linkedin Corporation; PCT/US05/31704 filed Sep. 2, 2005; International Search Report and Written Opinion; ISA/EP; Dec. 13, 2005; 7pp.

Bodie, John, "First Search Technology Report: Social Networking Platforms & Technologies", Copyright © 2004 by Boston Patent Research, Somerville, MA, (Jun. 2004),pp. 1-145.

Esther Dyson'S Monthly Report, Release 1.0, Nov. 19, 1996, 23 pp, EDventure Holdings, Inc., New York, New York.

M.A. Shah. ReferralWeb: A Resource location system guided by personal relations. Master's thesis, M.I.T., May 1997.

Bin Yu and Munindar P. Singh. An multi agent referral system for expertise location. In Working Notes of the AAAI Workshop on Intelligent Information Systems, pp. 66-69, 1999.

Kautz, Selman & Shah. The Hidden Web; American Association for Artificial Intelligence, pp. 27-36, Summer 1997.

Kautz, Selman & Shah. Referral Web: Combining Social Networks and Collaborative Filtering, Communications of the ACM, vol. 40, No. 3, pp. 63-65, Mar. 1997.

Byoungcheon Lee and Kwangjo Kim, "Secure Matchmaking Protocol", Article, 2001, 12 pgs., Information and Communications University, Korea.

Robert Armstrong, Dayne Freitag, Thorsten Joachims, and Tom Mitchell, "Webwatcher: A Learning Apprentice for the World Wide Web", Article, Mar. 19, 1997, 7 pgs., School of Computer Science, Carnegie Mellon University.

Keith Decker, Katia Sycara, and Mike Williamson, "Middle-Agents for the Internet", Article, 1997, 6 pgs.

Keith Decker, Anandeep Pannu, Katia Sycara and Mike Williamson, "Designing Behaviors for Information Agents", Article, 1997,9 pgs.

Keith Decker, Mike Williamson and Katia Sycara "Matchmaking and Brokering", Article, May 16, 1996, pp. 1-19, The Robotic Institute, Carnegie Mellon University, Pittsburgh, PA., USA.

Keith S. Decker and Katia Sycara, "Intelligent Adaptive Information Agents", Article, 1996, pp. 1-24, Kluwer Academic Publishers, Boston, Manufactured in the Netherlands.

Tom Mitchell, Rich Caruana, Dayne Freitag, John McDermott and David Zabowski,"Experience With a Learning Personal Assistant", Article, 1994, pp. 1-19, School of Computer Science, Carnegie Mellon University.

(56) References Cited

OTHER PUBLICATIONS

Upendra Shardanand and Pattie Maes, "Social Information Filtering: Algorithms for Automating Word of Mouth", Article, 13 pgs., 1995, MIT Media-Lab, Cambridge, MA.

Anthony Cassandra, Damith Chandrasekara and Marian Nodine, "Capability-based Agent Matchmaking", Article, 2 pgs., USA, copyright 2000.

Adrianna Vivacqua and Henry Lieberman, "Agents to Assist in Finding Help", Article, pp. 65-72, Apr. 1-6, 2000, Massachusetts Institute of Technology, Cambridge, MA, USA.

L Foner and I B Crabtree, "Multi-agent matchmaking", Article, pp. 115-123, Oct. 1996, BT Technology J, vol. 14, No. 4.

Daniel R. Kuokka and Larry T. Harada, "Issues and Extensions for Information Matchmalung Protocols*", Article, (1996), International Journal of Cooperative Information Systems, vol. 5, Nos. 2 & 3, pp. 251-273, World Scientific Publishing, USA.

Alexander I. Zelitchenko, "Information Retrieval Expert System Matchmaker" Article, 1992, Computers in Human Behavior, vol. 8, pp. 28 1-296, printed in USA, Moscow State University.

Evangelos Kranakis** and Paul M.B. Vitanyi, "A Note on Weighted Distributed Match-Making*", Article, (1992) Math Systems Theory 25, pp. 123-140.

Rajesh Raman, Miron Livny and Marv Solomon, "Matchmaking: An extensible framework for distributed resource management", Article, (1999), Cluster Computing 2, pp. 129-138, USA.

Sape J. Mullender and Paul M.B. Vitanyi, "Distributed Match-Making", Article, Algorithmica (1988) 3: pp. 367-391, New York, USA.

Somesh Jha, Prasad Chalasani, Onn Shehory and Katia Sycara, "A Formal Treatment of Distributed Matchmaking", Article, pp. 457-458, copyright 1998.

Sue Hutchinson, "Computer Matchmaker Finds a Ready Clientele", Article, 2 pgs., Sep. 11, 1992, San Jose Mercury News, Local Section, Penninsula/AM Edition, p. 1B, USA.

Adriana S. Vivacqua, "Agents for Expertise Location", 5 pgs., "1998", AAAI Spring Symposium on Intelligent Agents in Cyberspace, Stanford, Ca.

Katia Sycara, Jianguo Lu, and Matthias Klusch, "Inoperability among Heterogeneous Software Agents on the Internet", Oct. 1998, pp. 1-35, The Robotics Institute, Carnegie Mellon University, Pittsburgh, USA.

Bjorn Hermans, "Intelligent Software Agents on the Internet: an inventory of currently offered functionality in the information society & a prediction of (near-) future developments" Article, pp. 1-88, Tilburg University, Tilburg, The Netherlands, Jul. 9, 1996.

http://www.craigslist.org, used WayBackMachine—Jan. 22, 2002, Exhibits 1-7.

Mara, Janis, "List Man", Brandweek, vol. 41, Issue 33, Aug. 21, 2000.

Daniel Ingvarson, Dora Marinova, and Peter Newman, "Electronic Networking: Social and Policy Aspects of a Rapidly Growing Technology", Article, Electronic Networking: Social & Policy Aspects Proc., INET'94IJENC5, pp. 432-1-432-6; 1993.

Sally McClean, J. Hong, Bryan Scotney, M. Hatzopoulos, and I. Karali, "Using Intelligent Software Agents to Query Heterogeneous Distributed Statistical Databases", Article, pp. 769-774; 2001.

Katia Sycara, Matthias Klusch and Jianguo Lu, "Matchmaking among Heterogeneous Agents on the Internet", Article, pp. 1-13.; 1999.

Katia Sycara, Matthias Klusch, Seth Widoff and Jianguo Lu, "Dynamic Service Matchmaking Among Agents in Open Information Enviroments", Article, 7 pgs.; 1999.

Katia Sycara and Dajun Zeng, "Coordination of Multiple Intelligent Software Agents", Article, pp. 1-31, International Jouranl of Cooperation Information Systems, World Scientific Publishing Compant, USA, ; 1996.

Kan Zhang and Roger Needham, "A Private Matchmaking Protocol", Article, 9 Pgs. ; 2001.

Gerald Wickler and Austin Tate, "Capability Representations for Brokering: A Survery", Article, pp. 1-70; 1998.

"U.S. Appl. No. 11/678,978, Appeal Decision mailed Sep. 4, 2013", 7 pgs.

"U.S. Appl. No. 11/678,978, Notice of Allowance mailed Nov. 22, 2013", 9 pgs.

"U.S. Appl. No. 11/678,970, Appeal Decision mailed Jun. 30, 2014", 5 pgs.

"U.S. Appl. No. 11/678,978, Notice of Allowance mailed May 30, 2014", 7 pgs.

"U.S. Appl. No. 11/678,978, PTO Response to Rule 312 Communication mailed Apr. 27, 2015", 2 pgs.

* cited by examiner

Linked[in] DASHBOARD

*Keep-In-Touch Reminders*

Manage
Josh Higgins last sent you an email titled "patents" (Last Dec)
×
Valdis last received your email titled "forum comments" (Last Jan)
×

Birthdays and Anniversaries
Margaret Ann's birthday was Saturday (2/11)
×

*Contacts to Invite* (2 of 20)
Melinda Morrow
×
Jesse Lipnack
×

*Contact Updates*
To get further updates from LinkedIn, enter your sign in information for LinkedIn.
Updates from LinkedIn (2 of 51)
Review All
Steven Hobson is now at Alstrege as Sr. Software Engineer
×
Greg Wash has changed his primary email to greg@wash.com
×
Matt Colson is now VP Strategy at Hopkins, Inc.
×

Contacts from Your Email
Review All
Reed Holbrook    reed@hollbrook.com
Bill Pellington   bill@pellington.com
×

*Needs a Reply?*
Ken Stevens
Last week    Re: Parsing offer
             ×
Gina Williams
3 days ago   Recertification
             ×

*Needs Follow-Up?* (5 of 7)
Jan Thompson
Last week    Re: Meeting next month
         ×
William Renalds
5 days ago   help?
         ×
Halfson Bodegger
2 weeks ago  Re: checking in
         ×

FIGURE 5

SEARCHING AND REFERENCE CHECKING WITHIN SOCIAL NETWORKS

RELATED APPLICATIONS

The present application is related to and claims the benefit of the filing date of U.S. Provisional Patent Application with Ser. No. 60/773,008, filed on Feb. 13, 2006, which is hereby incorporated herein by reference.

TECHNICAL FIELD

The present invention relates to a "people-networking" scheme that may be embodied in computer software and/or hardware and that can be characterized as both a browser and broker of human networks on the Internet. When used in a computer network environment employing a client-server architecture, a client-side software application may act as a browser and relationship manager while a server component may act as a broker. When used in a peer-to-peer or distributed server architecture, the broker function can be distributed.

BACKGROUND

One theory behind social networking postulates that if person A wishes to meet person B, s/he can leverage friends and acquaintances to achieve that result. In the course of conducting their everyday affairs (whether personal or business), people generally access their networks of contacts for referrals, information and/or advice on a variety of matters, for example When choosing a physician When seeking a new employee or employer When investigating new investment opportunities.

In examples such as these, an individual's decisions can be made more efficient if s/he has access to the advice of trusted associates and friends. However, it is often the case that an individual will find that s/he does not know anyone with the information s/he needs at a specific place and time. In such a situation, the individual may try going out an extra degree within his or her own "human networks" by asking a contact to provide the name of a contact who may have the needed information. This presents a quandary for the person asked for a referral—namely, whether or not to reveal his or her contacts to the requestor. By making such revelations, the "connector" may compromise his or her network or expose one or more of his or her contacts to unwanted solicitations. By not making the referral, however, the connector may risk his or her association with the person seeking the referral. Whether or not to make the referral often depends upon the degree of trust that the connector has in the person seeking the referral and any past experiences in making such referrals to the target referee.

Even where the referral is ultimately made, there is no guarantee that the referee is going to be a suitable candidate for the original requestor's purpose. Thus, the requestor may be forced to track down a number of leads (many of which may be unsuitable) in the hope of finding a suitable target. This process is rather inefficient, usually because a) the requester does not have enough information about the contacts of his or her contacts in order to determine which contacts to approach for referrals, and/or b) the requester has failed to properly elucidate his or her requirements and/or because the requestor was not provided with sufficient information regarding the potential target to be able to eliminate him or her from further consideration. In other words, the profiles of the desired target and the resulting candidates were not sufficiently developed to meaningfully assist in the selection process.

Despite their inefficiencies, human networks are central to most, if not all, value-creating activities and operate at multiple levels, including personal networks (the personal and professional contacts each of us has), organizational networks (links within and between organizations), and associations and interest groups (people attracted by common values, interests, and goals). Today, many individuals may also be regarded as existing online community members, members of organizational networks (independent consultants, alliances, partnerships, consortiums, associations) or employees of small to large companies. They engage in human development, organizational learning, training, management, brokering, marketing, sales, trade, research, and consulting activities, all of which depend, to some degree, on inter-human networks. Such individuals generally understand the value of computer networks as tools for sharing information, but presently these individuals have only limited access to tools that can give them an edge (e.g., a competitive advantage) to make better human network connections on the Internet. However, even with the advantages provided by the Internet, opportunity is still limited by the reach of an individual's personal network.

Others have recognized some of these deficiencies and have proposed partial solutions. For example, some prior schemes for leveraging human network characteristics show the benefit of using automated means to assist in decision-making processes regarding the use of such networks. However, these schemes do not assist in the forming of relationships or introductions among members of disparate human networks nor do they provide for the brokering function discussed above, which is critical to the exchange of social capital among individuals. Other schemes include access control systems that generally allow only intended users to have access to information. Such systems may make use of encryption schemes, such as public/private key encryption schemes, or other access controls such as:

Simple access that is either open or closed.

Schemes wherein data or data areas are separated into public and private (or further) designations.

Schemes which use multiple access groups to which people and other groups are assigned.

Schemes involving role-based access control.

In addition to access control schemes, other profiling systems do exist and are often used as adjuncts to e-commerce technologies to provide some limited contact book updating capabilities.

SUMMARY OF THE INVENTION

The present invention provides advanced filtering, searching and reference checking tools and methods for use with and within social networking applications.

One embodiment of the invention provides a computer-implemented method in which one or more software agents broker matches between user-specified search criteria and targets, report such matches according to the level of identity between the search criteria and information found in profiles of the potential targets. The method also provides for a "one-click" reference search to allow a searcher to access information pertaining to the potential target among other sources within the searcher's network of connections, and then report on such references, ranked according to instructions specified by the searcher.

In one embodiment, a user interface (UI) object (e.g., a one-click reference search button) is provided, for example, on a web page displayed at a user's client device. When selected, the UI object causes a reference search query to be generated. The search query identifies the user performing the search, and a target person for whom the user would like a reference. The search query is communicated to, and processed by, a social networking system (e.g., through an API function call). In turn, the social networking system returns information about potential references to the client.

In a further embodiment of the invention, a one-click reference feature allows a user to automatically initiate an introduction request to an individual within the user's social network who has a direct connection to one or more of the targets identified during the user's search.

In another embodiment of the invention, a computer implemented method in which incoming messages are scanned, and the senders' names (and other user-definable information) are compared to a social networking application database, thereby initiating a search for a profile that matches the sender within the database. Upon locating such a profile, summary information concerning the sender (e.g., as extracted from the database) is displayed along with the incoming message.

In a further embodiment of the invention, incoming messages (e.g., e-mail messages, IM messages, etc.) are filtered by a computer implemented system according to user-definable instructions. The filtered messages are prioritized, again according to user-definable criteria, and information therein used to search a social networking application database for summary information regarding the senders of the filtered and prioritized messages, such that each message can be displayed along with that summary information.

The incoming messages may be filtered according to user-definable instructions that include one or more of the following: a sender's relationship to the recipient as determined by the social networking application, the sender's current title and place of employment, the sender's profile summary, as entered by the sender into the social networking application, reputation information about the sender as derived from the social networking application, relevance of the content of the message as compared to the interests of the recipient which the recipient may have recorded in his or her own profile in the social networking application or elsewhere, and the relevance of the content of the sender's profile to the recipient's profile, as recorded for each in the social networking application or elsewhere.

Another embodiment of the invention provides a computer implemented method that provides a mechanism for viral forwarding of searches conducted within a social networking application. A user is permitted to select criteria for a search within a social networking database, conduct the search and view results displayed, and is then offered a list of individuals to whom the search criteria and results could be forwarded in order to obtain improved results by virtue of access to the personal networks of those other individuals. Such a list may include individuals that satisfy user-definable criteria. and such individuals may be ranked according to user-specified criteria. The user may also be able to select individuals from the list recommended by the system to whom the search should be forwarded. An embodiment of the invention would also allow the user to attach a message to the forwarded search.

In still another embodiment of the invention, a mechanism is provided whereby each person receiving a forwarded search may in turn forward that same search to others. Each time a search is so forwarded, if permitted by the searcher, the individual forwarding the search has the ability to modify, add to, or otherwise alter the search. Individuals receiving forwarded searches are selected based on user-definable criteria, wherein those criteria can include one or more of the following: connection threshold, connection strength, affiliations with organizations, industries or employers, schooling, or other elements of profiles the user wishes to use as a filter.

BRIEF DESCRIPTION OF THE DRAWINGS

These and other more detailed and specific objects and features of the present invention are more fully disclosed in the following specification, reference being had to the accompanying drawings, in which:

FIG. 1 illustrates a Web page, and in particular a member profile page, for a social network platform including a "One Click Reference Checking Option" displayed therein;

FIG. 2 illustrates search results received from reference check initiated as a result of a user selecting the one click reference checking option shown in FIG. 1;

FIG. 5 illustrates one example of a dashboard configured to handle several related relationship management functions, to include: "Keep In Touch Reminders," "Contacts to Invite," "Contact Updates," "Needs a Reply?," and "Needs a Follow-Up?", consistent with some embodiments of the present invention.

DETAILED DESCRIPTION

Figure 3:
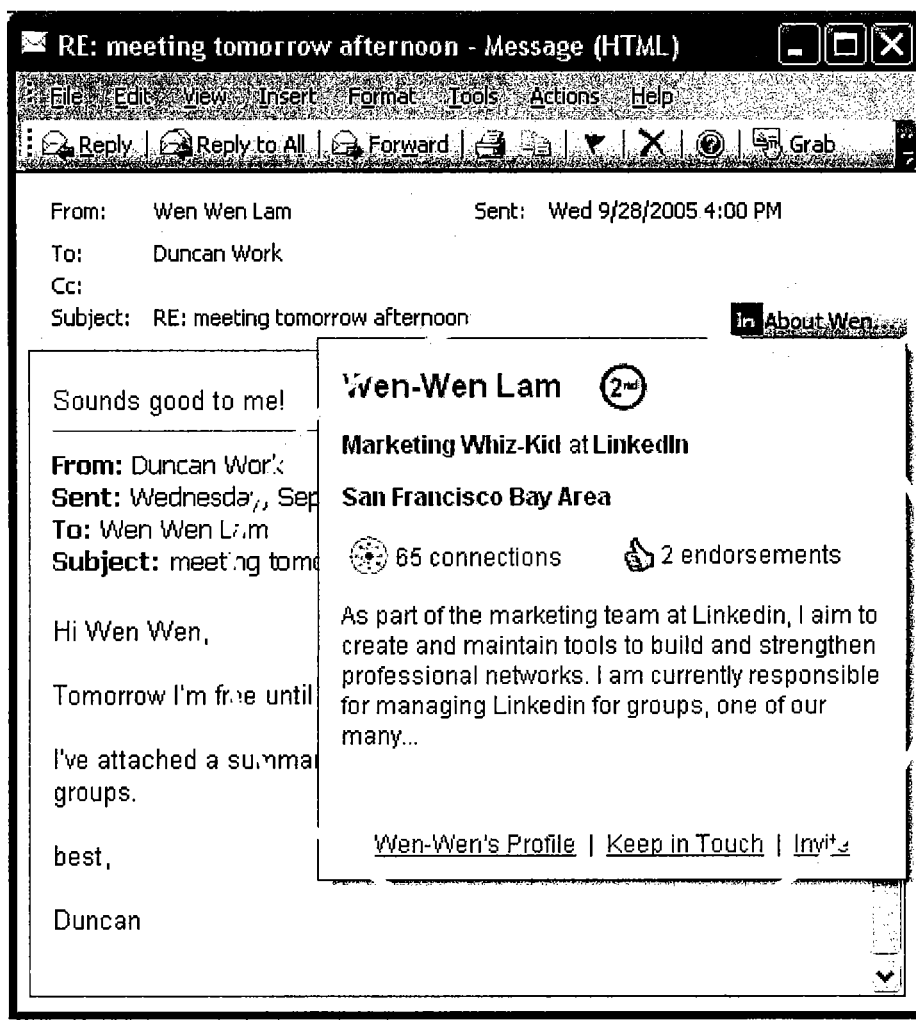
FIG. 3 illustrates an example of message filtering capabilities provided by embodiments of the present invention and, in particular, shows a mouseover of an icon included in a window in which an incoming message is displayed, and a resulting pop-up window that contains summary information about the message sender along with links to more detailed information about the sender and the sender's relationship to the message recipient.

Described herein are improvements and enhancements for social networking applications including search and user interface components, advanced message management functions, and systems and methods to augment searches through a process of viral forwarding of search profiles.

Some portions of the detailed description that follows are presented in terms of algorithms and symbolic representations of operations on data within a computer memory (e.g., using flowcharts and the like). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, objects, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing,"

"calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. The various objects, data structures, algorithms, etc. described herein may be stored as computer-readable instructions on computer-readable media in the conventional fashion.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. Java is a form of an object-oriented (i.e., focused on data and the interfaces to it), dynamic programming language for computer systems developed by Sun Microsystems of Mountain View, Calif. Java has an extensive library of subroutines for coping with TCP/IP (transmission control protocol/Internet protocol) protocols like HTTP (hypertext transfer protocol) and FTP (file transfer protocol). Thus, Java applications can open and access objects (i.e., data) across the Internet (or other computer networks) via URLs (uniform resource locators, also known as web addresses) similar to the way other software can access a local file system. Because Java was designed to support applications on networks, which may be composed of a variety of systems with a variety of central processing unit (CPU) and operating system architectures, all Java programs are compiled to an architecture- or platform-neutral object file format. Thus, the compiled code is executable on many processors.

The present invention can likewise be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network.

Computer implemented social networking applications help people find and obtain trusted referrals to other people they wish to meet by taking advantage of the social connections of their own friends, acquaintances, and family. Such a system was described in U.S. patent application Ser. Nos. 09/852,336, 11/146,815 and 11/219,035 each of which is incorporated herein for reference. One component of social networking is the ability to find individuals among one's connections to provide personal insights and knowledge about people one would like to meet. Another component of social networking is the use of reputation information to efficiently determine which individuals within one's contacts is most likely to have the information best suited to one's purpose. What is needed in a computer-implemented system of social networking is a way to efficiently integrate one's everyday methods of communications, particularly digital communications, with the knowledge contained in the aggregate of all of one's contacts.

One-click Reference Checking

As a component of social networking, contacts are valuable for not only finding an individual the searcher wishes to meet, but also for finding persons who can act as references to give the searcher personal insights and knowledge about individuals the searcher may wish to meet. When checking references, searchers typically wish to check the references explicitly provided by the individual being checked. In order to establish increased objectivity as well as to create increased personal trust and rapport between the person providing the reference and the searcher, an ability to find individuals in addition to those provided by the person being checked is desirable. For example, if John would like to evaluate Paul, John will speak with the references Paul has provided, but John would also like to speak with others who may be able to provide John with further insight on Paul. Ideally, these "hidden" references will be individuals whom John knows, or who are trusted contacts of one of John's trusted contacts.

Embodiments of the present invention build on the systems and methods described in the above-cited U.S. Patent Applications by adding unique search and user interface components that enable users of social networking systems to find and choose appropriate additional references who have not been revealed by the targeted candidate. Hence, embodiments of the present invention include mechanisms for conducting searches for potential target persons that match the search criteria provided by the searcher or by defaults inherent in the social network system. An option is provided for each target person found as a selectable (e.g., by mouse click or other cursor control event) link for a "one-click reference".

Figure 1:
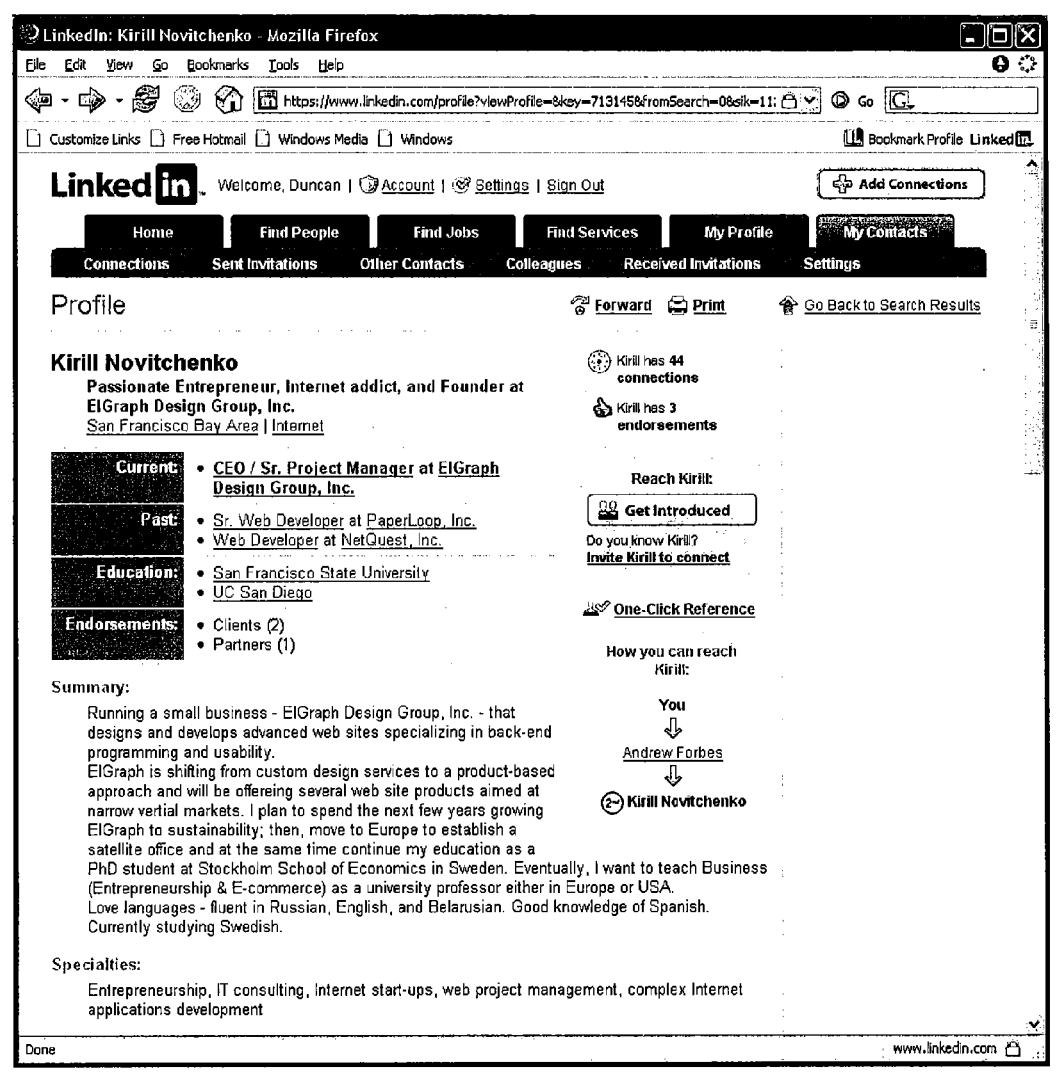

Referring to FIG. 1, a hyperlink (designated as a "One Click Reference" link in the illustration) within a Web page that includes an individual's personal profile may allow other users to locate people who can act as references for the subject individual. Clicking on or otherwise selecting this link initiates a search for individuals in the searcher's network who have attributes in their stored profiles that indicate they may know the target. For example, as part of the search the system may specifically look for individuals who list an organization, such as an employer, where the potential target and the searcher's contact have both belonged to this same organization for an overlapping time period. The system may then sort the results of such a search so as to bring the most relevant results to the top of the list. Results may be deemed more or less relevant according to criteria established by the searcher or chosen by the searcher from a list of options provided by the system.

Figure 2:
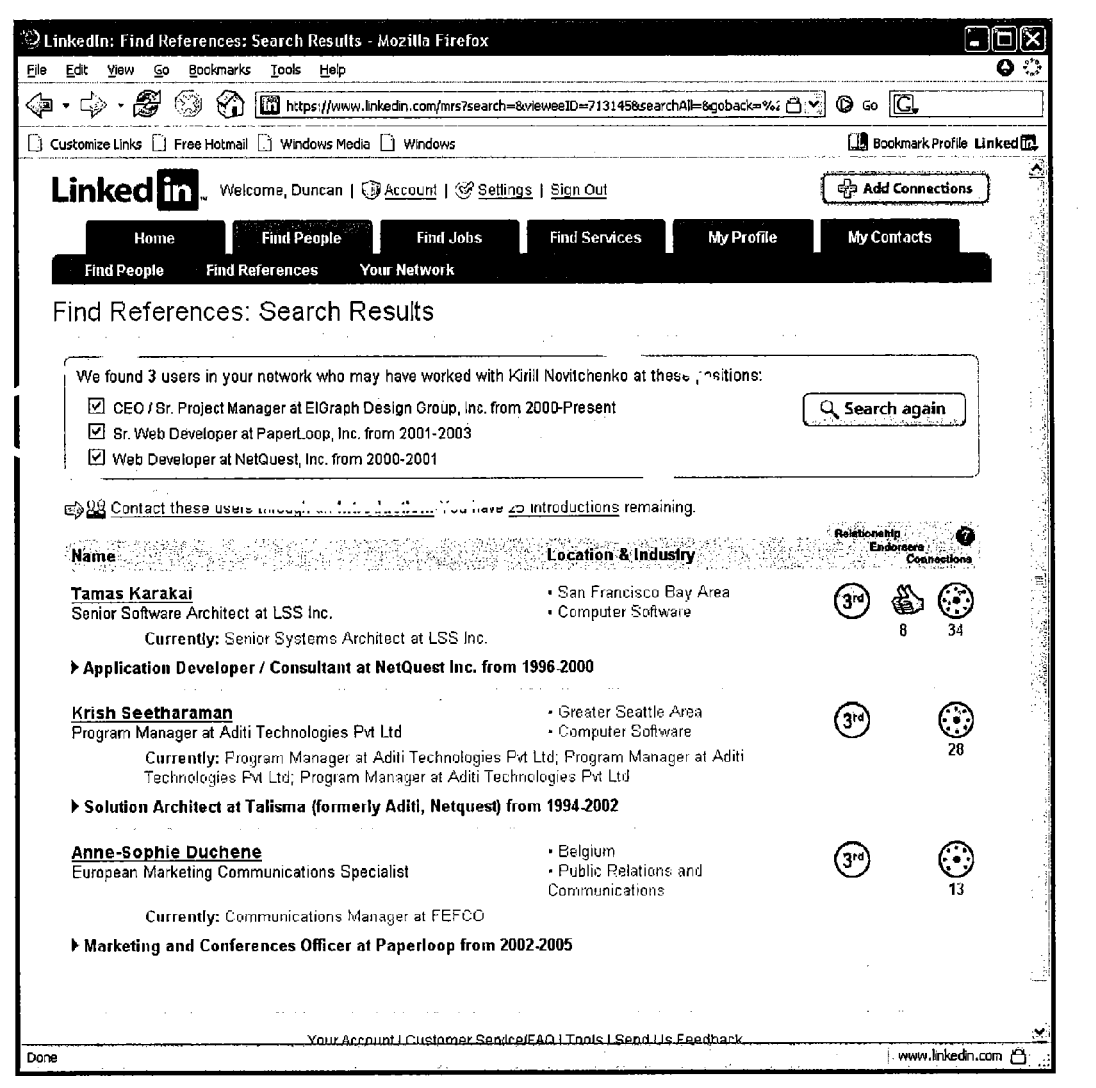

FIG. 2 illustrates an example of such reference search results presented to the searcher. In some cases, a brief summary of each reference may be shown, along with links to more detailed profiles of each reference, as part of the search result. Since time (e.g., currency) and the nature of the target's position or company is likely to be highly relevant to the searcher's evaluation, the example of a search result shown in FIG. 2 includes information on how many likely references have been found who overlap with the target in particular positions. The searcher is provided with an ability to uncheck or deselect check boxes next to positions that are not relevant and then run the search again to be presented with a list comprising those individuals who overlap the target in companies for the remaining checked positions.

FIG. 2 also illustrates one mechanism by which summary information is provided about each potential reference, including the reference's own current position and employer, degrees of connection to the searcher, number of endorsements by other users, and any other relevant attributes that prove useful to the searcher in a particular embodiment of the invention. By clicking on a link to a reference, the searcher is presented with a full profile for that individual. In an embodiment of the invention, the searcher is also able to initiate an introduction request to be sent to the potential reference through another individual who connects the searcher to the potential reference.

Figure 4:
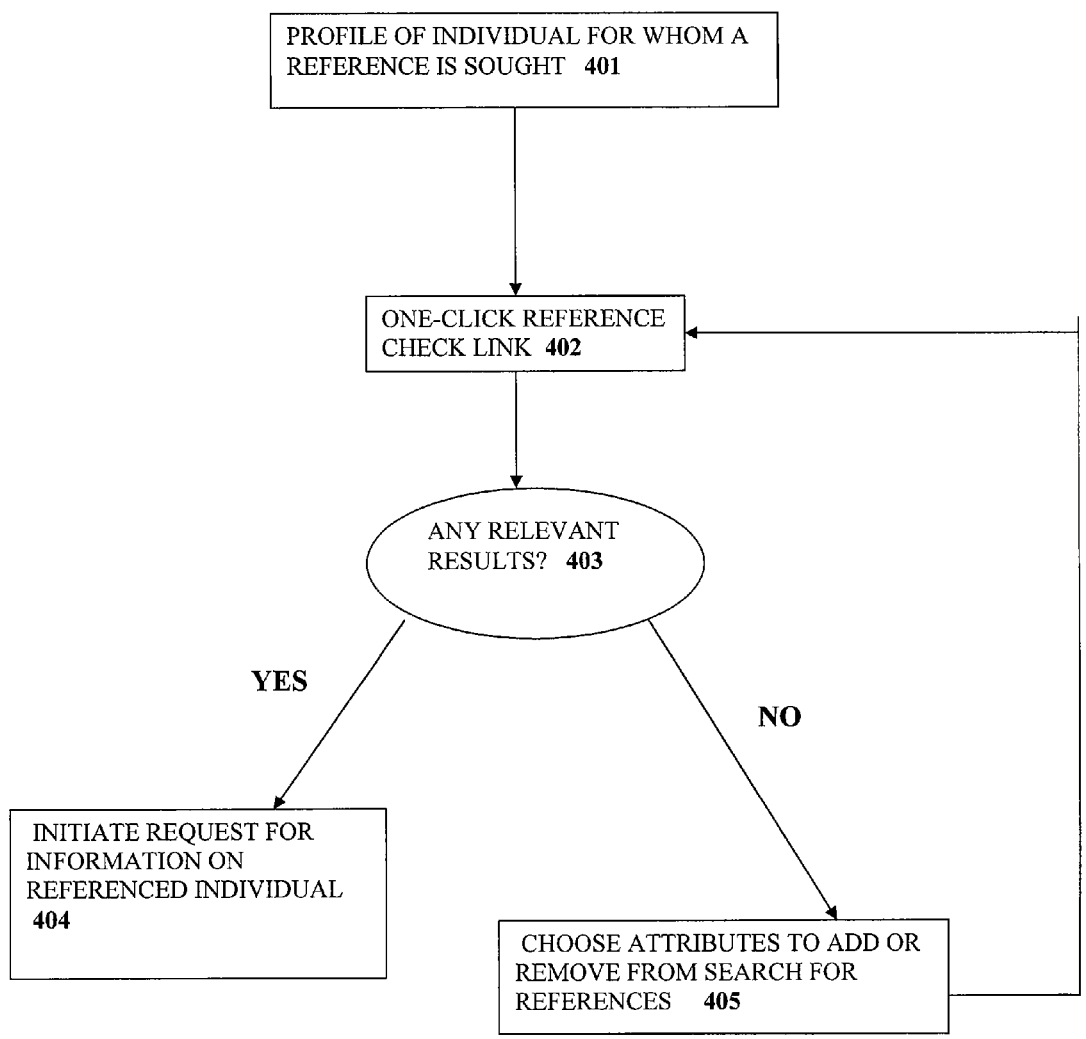
FIG. 4 is a flowchart illustrating a process of one click reference checking in accordance with an embodiment of the present invention.

FIG. 4 is a flowchart illustrating an example of a method for one click reference checking according to an embodiment of the present invention. Once a user clicks on the reference link pictured in FIG. 1 and represented in FIG. 4 at 402, a search is conducted of the user's social network to find individuals whose personal profiles indicate they may know the target for whom references are sought. An example would be a search that was directed to individuals who attended the same school as the target in an overlapping time period.

If the search is successful 403, the user may initiate a request for information on the target from one or more of the potential reference 404. If the results are not useful, the user has the option to choose attributes to add or remove from the one click reference search 405 and run the search again 402 using these new parameters.

Incoming Message Relationship Information and Filtering

Social network applications can provide extremely valuable information to help in evaluating the potential importance of incoming messages by providing information about the sender that would otherwise not be known to the recipient. The present invention includes improvements and enhancements to user interface designs and message management functions that build upon and significantly add to the field of social networking.

Embodiments of the invention can be implemented with any type of digitized messages, including email, instant messaging, telephone and any type of digital communications environment, including client-server and person-to-person (p2p). With email as an example of an incoming message, embodiments of the invention include a computer-implemented mechanism to scan certain portions of each incoming email that arrives in a user's message inbox. As each message arrives, the sender's name and digital address are extracted and provided to a social networking application database that may be external to the user's email application. If the system matches information about the sender to information recorded in the database, the system retrieves pre-determined summary information about the sender to be displayed along with the incoming message.

As shown in FIG. 3, in one embodiment of the invention, a small icon may be included in a window in which the incoming message is displayed. The icon indicates to the recipient that more information is available about the sender. When the recipient passes a cursor over the icon (an action known as a mouseover event), a new window opens (such pop-up windows are well known in art). This new window may be used to display summary information about the sender (i.e., the information extracted from the social network database) along with links to more information about the sender and the sender's relationship to the recipient.

Information about the sender may include any one or more of the following:
 1. The sender's relationship to the recipient as determined by the social network application. For example, whether the sender is 1, 2, or 3 (or more) degrees away from the sender (each degree representing a connecting person in a chain of person-to-person relationships connecting the sender to the recipient).
 2. The sender's current title and company and profile summary as entered by the sender in his/her profile in the social networking application. In some cases someone other than the sender may have entered the information, for example the sender's profile may actually be included in a contact list of another user of the social networking application; or the sender's profile may have been extracted from other sources.
 3. A link to the sender's profile entry in the social networking application.
 4. Reputation information about the sender, as derived from the social network application.
 5. Relevance of the content of the message as compared to the interests of the recipient, which interests the recipient may have recorded in his or her own profile in the social networking application or elsewhere.
 6. Relevance of the content of the sender's profile to the recipient's profile, as recorded for each in the social networking application or elsewhere.

The present invention thus makes it possible for the message recipient to see additional information about the sender derived from a social networking application and then conveniently overlaid upon the incoming message for easy reference and evaluation. Providing this information to the user in a convenient display streamlines the process by which the user decides whether or not to read and respond to the current message.

In another embodiment of the invention, the same information is additionally used to filter and prioritize incoming messages for the recipient's attention and according to either default instructions or customized instructions provided by the user/recipient. For example, messages may be prioritized and flagged, or sorted by order of display or into various message folders, or discarded, according to specific combinations of factors chosen by the user. Such factors may include: the sender's degree of separation from the recipient; minimum indications of closeness of connection or trust connecting the sender and recipient; relevance of the sender's message content to the recipient's stated interests; relevance of sender's profile content to the recipient's profile content; and reputation information about the sender.

Viral Forwarding of Searches in a Social Networking Application

The present invention improves on prior social networking applications by allowing users to augment their searches by forwarding those searches on to other people.

In embodiments of the invention, an original searcher will define criteria for a search and then launch the search. The searcher then requests that the search be forwarded on to other people. The system responds to this request by compiling a list of recommended individuals to whom the searcher should forward the search. The list of recommended individuals may be compiled using various techniques for (a) finding actual connectors who may have been filtered out of the original search results (e.g., by their own access controls or by the criteria of the searcher), and/or (b) finding likely connectors whom the searcher knows.

Criteria used by the system for selecting individuals to whom the search should be forwarded include:

1. Direct connections of the searcher who are also direct connections to one or more people who were ranked high in the list of people in results from the original search. The theory is that since these individuals already have connections to people who match the search criteria, it is very likely that their own social networks include an even greater number of people who meet the criteria, but who may not have been accessible to the searcher because, for example, they are not included in the social networking database, or because of access instructions previously entered by the searcher's connection.
2. The searcher's two-degree connections who are one degree away from highly ranked results of the original search.
3. People who match the original search and who are closely connected to the searcher by degree and other measures of closeness. People who match the search are likely to know others who match the search.
4. People whose profiles indicate a likelihood that they know others who match the search criteria. For example, individuals in certain professions or industries are likely to know others in those professions or industries.

In some embodiments of the invention, the user will have the option to select some or all of the individuals recommended for receiving the forwarded search. The user will also be able to compose a message to accompany the forwarded search.

In some embodiments of the invention, the following information accompanies the forwarded search:

1. A message from the original searcher.
2. The original search criteria.
3. An option for the recipient to indicate that he or she actually matches the search criteria.
4. An option for the recipient to further forward the search to selected people in his or her own network.
5. A list of the intended secondary searcher's connections to whom the system recommends that the secondary searcher should forward the search. This list is built using the same method as used for the original searcher; but at the secondary searcher's option it is not shared with the original sender.
6. An option for the recipient to add additional people to the list of people to whom the search will be forwarded.

In accordance with embodiments of the invention, the process of compiling a list of potential recipients of the search and then forwarding the search to those recipients along with recommendations for further forwarding, can continue up to the number of iterations limited by settings of any searcher in the chain of searchers, or by the settings of the system. The end result of forwarding the search even a few iterations will be the ability of the original searcher to reach a far broader network of contacts than would have been possible if the search had been contained within his own circle of contacts.

Contact Management Dashboard

The present invention significantly enhances the ability of users of social network applications to manage their contact information and interactions with their contacts through a social-network-enhanced "dashboard" user interface where users can quickly see and manage many aspects of their relationships, including messages which the user has sent to and received from various contacts of the user. FIG. 5 illustrates one embodiment of this dashboard configured to handle several related relationship management functions, including, in the case of this embodiment, a) "Keep-in-Touch Reminders", b) "Contacts to Invite", c) "Contact Updates", d) "Needs a Reply?", and e) "Needs Follow-Up?".

In order to support all of these functions, the system periodically scans and analyzes the user's sent and received email messages, contact lists on the user's personal computer system, and information updates made by the user's personal contacts on the shared social networking application. Updates made by the user's contacts may include, for example, their current position titles and companies names, updates to their email addresses and other contact information, updates to their information about their own personal contacts, and updates or additions to any other components of their personal profiles in the shared social networking application.

Each time the dashboard is viewed by the user the system updates each section of the dashboard based on information retrieved from the latest scan, as stated above, and including results of analysis completed by the system against the updated information scanned. The system also takes into consideration any information available regarding permissions granted to the user by the user's contacts pertaining to the user's ability to view their updated information.

When determining what information to display in each section of the dashboard, and in what order, the system takes into account specific factors related to each section, as will be further described below. In addition, in all of these sections, the system also takes into account the relative importance to the user of the contact to which the relevant information pertains. For example, relevant information about contacts may be given higher rank in the displayed list based on one or more of the following factors:

1. the strength of connection between the user and the contact;
2. the degree of trust assigned by the user to the contact; and
3. indications of frequency and reciprocity of interactions between the user and the contact as determined by analysis of messages sent to and received from the contact.

In each case the dashboard also presents the user with the opportunity to fine-tune information recorded about any of these factors related to specific contacts. For example, when selected the "Manage" button next to the "Keep-in Touch Reminders" shown in FIG. 5 causes a new window to open (e.g., a pop up window), which window includes a Web form or other device that allows the user to add or remove people in the user's "keep-in-touch" list, or to modify information about their priority, strength of connection to the user, etc.

Next to each item shown in each section the user is also provided means within the dashboard to immediately respond to the item. For example, the "Send Email" button next to items in the "Keep-in-touch Reminders" section, when selected, will cause a new email composition window to open, allowing the user to send a new message to the contact referred to.

In the embodiment illustrated in FIG. 5 and described below, email messages are scanned, analyzed and displayed when appropriate; however, other embodiments may also be built which also work with other types of messages such as instant messages and voice messages.

1. Keep-in-Touch Reminders: This section displays reminders to keep-in-touch with important contacts of the user.

The system determines which individuals to include in this display based on a number of factors, including i) the relative importance of the contact to the user, ii) the length of time it has been since the user corresponded with the contact, and iii) the proximity of dates given for any special kinds of reminders about the contact that have been recorded in the user's information on this contact, for example, birthday or anniversary dates.

2. Contacts to Invite: This section displays apparently important contacts discovered by analysis of the user's incoming and outgoing messages and to whom the user is not currently directly connected on the social networking system. The "Invite" button allows the user to quickly send an invitation to connect to this contact.

3. Contacts Updates: In one embodiment of the invention, this section includes two sub-sections. The first of these in FIG. 5 shows updates discovered from the shared social networking application ("Updates from LinkedIn"). These represent changes made by users in their profiles within the social networking application, and to whom the present user is connected via that application. These changes include, for example, changes in position title, company, position descriptions, skills, etc., that are different from data in the user's contact information that are stored in the user's own personal system. The second subsection shows email addresses discovered from analysis of the user's email when those email addresses aren't included in the user's contact information stored on their personal system.

4. Needs a Reply?: This section includes emails which have been sent to the user by one of the user's important contacts and which appear to require a reply from the user. The need to reply is based on a) indicators contained within the body of the message, for example, the presence of a question mark or other semantic indicators that a question is being asked of the user, b) any reminder flags which the user may have previously set regarding this message, and c) the lack of a reply made by the user to this particular email. In addition, the determination of priority of need to reply may also be based on indicators of the importance of the sender to the user, as described above. The interface used for this section of the dashboard includes links which the user may click in order to view the email in question, or to view information about the sender of the message.

5. Needs Follow-up?: This section is the inverse of the "Needs a Reply?" section and includes emails which the user has sent to others which need a response from the recipient. This is determined based on i) indicators contained within the body of the message, for example, the presence of a question mark or other semantic indicators that a question is being asked by the user, ii) any reminder flags which the user may have previously set regarding this message, and iii) the lack of a reply made by the recipient of this particular email. In addition, the determination of priority of need to reply to follow-up may also be based on indicators of the importance of the recipient to the user, as described above.

6. Terminology: the following glossary is provided for readers who might not be familiar with some of the terms used herein:

7. Web Pages: One way to establish a presence on the Internet is by placing a Web page, which is, ultimately, a computer data file on a host operating a Web server within a given domain name. When the Web server receives an inquiry from the Internet, it returns the Web page data in the file to the computer making the inquiry. The Web page may be a single line or multiple pages of information and may include any message, name, word, sound or picture, or combination of such elements. Most Web browsers will show somewhere on the screen the domain name of the Web page being shown and will automatically include the domain name in any printout of the Web page. There is no technical connection or relationship between a domain name and the contents of the corresponding Web page. There are a number of ways for an Internet user to find a Web page. Web browsers feature access to various indexes, commonly referred to as search engines. Well-known indexes include InfoSeek™ Guide, Lycos™, ExCite™ and Yahoo™. These indexes will allow the user to enter a name or a word or a combination of words, and will return the results of the search as a list of "hyperlinks" to Web pages that have information within or associated with the document making up the page responding to the search.

8. Hyperlinks: A hyperlink is a link from one site on the Internet to a second site on the Internet. "Clicking" (or, more generally, selecting using a cursor control device such as a mouse, joystick, touch pad, etc.) on a designated space on the initial site which references the subsequent site by a picture, highlighted text or some other indication will direct the user's browser from the initial site to the second site. In addition to their use in indexes, hyperlinks are commonly placed on Web pages, thus allowing Internet users to move from Web page to Web page at the click of a button, without having to type in URLs. Hyperlinks are also used to initiate the transfer of files or other information from the hosting resource to the user's computer in a process commonly known as downloading. Hyperlinks can be and commonly are established without reference to the domain name of the second site. A hyperlink is not technically related to a domain name and therefore it can be identical to an existing domain name without conflicting with that domain name. For example, were the operator of a Web page known as SITE to establish a home page at http://www.xyz.com, any number of indexes could be employed and hyperlinks could be established to bring up the page through use of the word SITE.

9. Web Forms: In general, a form is a collection of form fields displayed as a Web page by a browser in response to hypertext mark-up language (HTML) tags and other information received from a Web server. An associated form handler resides at the server to collect and process the information submitted by a user via the form. By using such forms, an information collection process performed by a host is made interactive with the users thereof. That is, users can add text to text boxes, select from drop down menus and/or select check boxes and/or radio buttons, etc. Typically, the user submits the form by clicking on a submit button or other appropriately labeled element of the form and, upon such submission, the contents of the form are passed to the form handler. Depending upon the type of information being submitted and the type of form handler being used, the information submitted by a user may be appended to a file maintained by the host, for example a file associated with a temporary account assigned to the user or a larger database. In this way information may be collected, processed and displayed to those who access it.

10. Text Boxes: A text box is a standard form field into which a user can type text. When a form containing a text box is submitted in a Web browser, the name and contents of the text box are provided to the form handler running on the server.

11. Check Boxes: A check box field is typically arranged in a grid or matrix fashion with one or more cells of the matrix including a check box. Check box fields present a user with choices that can be made by clicking (e.g., selecting or deselecting as appropriate) a check box. Such fields are created and rendered using programming techniques common in the art and any number (including all or none) of individual check boxes may be selected or not. When a user submits a form containing a check box field, the name of each check box along with its value is provided to the form handler at the host.

12. Radio Buttons: Radio button fields present a user with a choice that can be made by selecting a button. Radio buttons are displayed in a set, only one of which may be selected at a time. When radio button fields are created, they are assigned a group name, and each button in the group is assigned a value and an initial state (selected or not selected). When the user selects one of the buttons in the field, all other buttons in the field take on a value of not selected. Then, when the user submits the form, the group name and value of the buttons is provided to the corresponding form handler at the server for processing.

The above description is included to illustrate the operation of various embodiments of the present invention and is not meant to limit the scope thereof.

What is claimed is:

1. A computer-implemented method, comprising:
    receiving, via a first user interface presented in a first web page, search criteria for a search to be performed, the search to identify members of a social networking system having member profiles that satisfy the search criteria;
    using the received search criteria, performing a search of member profiles to identify one or more member profiles that satisfy the search criteria;
    causing a second user interface to be presented in a second web page, the second user interface displaying a first set of search results including the one or more member profiles identified as having satisfied the search criteria;
    receiving, via the second user interface, user-input representing a selection of a particular member profile presented in the set of search results;
    responsive to receiving the user-input, causing a third user interface to be presented in a third web page, the third user interface representing a member profile page for the particular member profile that has been selected from the search results, the third user interface presented in the third web page including a user interface object configured to facilitate an automated search of the social networking system to locate references for the member whose member profile has been selected from the search results and presented via the third web page;
    upon detecting selection of the user interface object, automatically performing a second search of the social networking system for individuals within a social network of a searcher that selected the user interface object and whose member profiles indicate employment with an organization at which the member whose member profile has been selected from the search results and presented via the third web page was also employed during a common time period; and
    subsequent to performing the second search, causing a fourth user interface to be presented in a fourth web page, the fourth user interface presenting a second set of search results for the second search.

2. The computer-implemented method of claim 1, further comprising:
    facilitating initiation of an introduction request to be sent on behalf of the searcher to a person who connects the searcher to the member whose member profile has been selected from the search results and presented via the third web page.

3. The computer-implemented method of claim 1, wherein the user interface object is a user-selectable button or hyperlink.

4. The computer-implemented method of claim 3, wherein the user interface object is served from a server different from a server hosting the social networking system.

5. The computer-implemented method of claim 1, further comprising:
    displaying, for each result in the set of second search results, along with the name of a respective reference, a second user interface object, wherein the second user interface object, when selected, facilitates a communication mechanism enabling the searcher to request information from the respective reference.

6. The computer-implemented method of claim 5, wherein the communication mechanism is an email automatically addressed to the respective reference when the searcher is directly connected with the respective reference in the searcher's social network.

7. The computer-implemented method of claim 5, wherein the communication mechanism is an email automatically addressed to a person who connects the searcher with the respective reference via a chain of person-to-person connections, as indicated by information in social networking profiles.

8. The computer-implemented method of claim 1, wherein the results for the second set of search results are ordered in accordance with criteria established by the searcher.

9. The computer-implemented method of claim 1, wherein the fourth user interface as presented in the fourth web page includes a list of previously and/or currently held employment positions of the member whose member profile has been selected from the search results and presented via the third web page, wherein selection of an employment position in the list will modify the presentation of the second set of search results to include as results of the second search only members whose member profile indicates employment with an organization at which the member, whose member profile has been selected from the search results and presented via the third web page, was employed in an employment position identified by the selected employment position, during a common time period.

10. A computer-implemented method, comprising:
    displaying a member profile page for a target user within a social network;
    receiving, via the member profile page, a request from a requesting user within the social network to search for one or more reference users connected to the requesting user within the social network and having a member profile indicating employment at an organization at which the target member was employed during a common time period;
    identifying one or more reference users connected to the requesting user and having a member profile indicating employment at an organization at which the target member was employed during a common time period; and
    presenting a result of the request to the requesting user that includes information associated with the identified one or more reference users and a list of previously and/or currently held employment positions of the target user, wherein selection of an employment position in the list will modify the presentation of the one or more identified references to include only those references whose member profile indicates employment with an organization at which the target user was employed in an employment position identified by the selected employment position, during a common time period.

11. The computer-implemented method of claim 10, wherein presenting a result of the request to the requesting user includes presenting information associated with a subset of the identified one or more reference users in response to input received from the requesting user.

12. The computer-implemented method of claim 10, wherein receiving, via the profile page, a request from a requesting user within the social network to search for one or more reference users includes receiving the request via a user-selectable button presented via the profile page.

13. A non-transitory computer-readable storage medium whose contents, when executed by a computing system, cause the computing system to perform a method, the method comprising:

displaying a member profile page for a target user within a social network;

receiving, via the member profile page, a request from a requesting user within the social network to search for one or more reference users connected to the requesting user within the social network and having a member profile indicating employment at an organization at which the target member was employed during a common time period;

identifying one or more reference users connected to the requesting user who have a member profile indicating employment at an organization at which the target member was employed during a common time period; and presenting a result of the request to the requesting user that includes information associated with the identified one or more reference users, and a list of previously and/or currently held employment positions of the target user, wherein selection of an employment position in the list will modify the presentation of the one or more identified references to include only those references whose member profile indicates employment with an organization at which the target user was employed in an employment position identified by the selected employment position, during a common time period.

14. The non-transitory computer-readable storage medium of claim 13, wherein presenting a result of the request to the requesting user includes presenting information associated with a subset of the identified one or more reference users in response to input received from the requesting user.

15. The non-transitory computer-readable storage medium of claim 13, wherein receiving, via the profile page, a request from a requesting user within the social network to search for one or more reference users includes receiving the request via a user-selectable button presented via the profile page.

* * * * *